(12) United States Patent
Haile et al.

(10) Patent No.: US 10,352,772 B2
(45) Date of Patent: Jul. 16, 2019

(54) DIGITAL TEMPERATURE SENSOR WITH INTEGRATED TIMER AND BURST MODE

(71) Applicant: Microchip Technology Incorporated, Chandler, AZ (US)

(72) Inventors: Ezana Haile, Austin, TX (US); Patrick Richards, Peoria, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 44 days.

(21) Appl. No.: 15/607,560

(22) Filed: May 29, 2017

(65) Prior Publication Data

US 2017/0261379 A1 Sep. 14, 2017

Related U.S. Application Data

(62) Division of application No. 14/560,342, filed on Dec. 4, 2014, now Pat. No. 9,664,571.

(60) Provisional application No. 61/921,183, filed on Dec. 27, 2013.

(51) Int. Cl.
*G01K 1/00* (2006.01)
*G01K 7/01* (2006.01)

(52) U.S. Cl.
CPC ............... *G01K 1/00* (2013.01); *G01K 7/01* (2013.01); *G01K 2219/00* (2013.01)

(58) Field of Classification Search
CPC ............ G01K 1/00; G01K 1/028; G01K 7/01; G01K 7/42; G01K 2219/00; G01K 1/20; G01K 1/22; G01K 1/24; G01K 7/425
See application file for complete search history.

(56) References Cited

U.S. PATENT DOCUMENTS

| 4,228,511 | A | * | 10/1980 | Simcoe | G05D 23/1905 165/257 |
| 4,718,776 | A | | 1/1988 | Gilland et al. | 374/170 |
| 5,760,720 | A | * | 6/1998 | Nolan | G01R 35/005 341/120 |
| 5,961,215 | A | | 10/1999 | Lee et al. | 374/178 |

(Continued)

FOREIGN PATENT DOCUMENTS

WO 2008/078131 A1 7/2008 ............... G06F 1/32

OTHER PUBLICATIONS

Chinese Office Action, Application No. 201480070303.9, 13 pages, dated Apr. 18, 2018.

(Continued)

*Primary Examiner* — Lisa M Caputo
*Assistant Examiner* — Philip L Cotey
(74) *Attorney, Agent, or Firm* — Slayden Grubert Beard PLLC

(57) ABSTRACT

An integrated temperature sensor device has a temperature sensor providing an analog signal corresponding to an ambient temperature, an analog-to-digital converter coupled to the sensor conditioning circuit and receiving the analog temperature signal, and a timer and control circuit which is operable to be configured to control the temperature sensor device to perform a sequence of temperature measurements and shut-down time periods, wherein multiple temperature measurements are taken during the measurement period, wherein the timer and control circuit is further operable to be programmed to set the number of temperature measurements and the length of the shut-down period.

25 Claims, 2 Drawing Sheets

(56) References Cited

U.S. PATENT DOCUMENTS

| | | | | |
|---|---|---|---|---|
| 6,191,546 B1* | 2/2001 | Bausch | ................. | G06F 1/206 |
| | | | | 318/452 |
| 6,246,831 B1* | 6/2001 | Seitz | ................... | F24H 9/2021 |
| | | | | 219/483 |
| 6,991,369 B1 | 1/2006 | Garavan | ...................... | 374/178 |
| 7,528,574 B1 | 5/2009 | Adkins et al. | ............... | 320/128 |
| 8,540,644 B2 | 9/2013 | Husheer | ....................... | 600/549 |
| 8,649,997 B2* | 2/2014 | Farrell | .............. | A61B 5/14532 |
| | | | | 340/573.1 |
| 9,664,571 B2 | 5/2017 | Aberra et al. | | |
| 2001/0021217 A1 | 9/2001 | Gunther et al. | ............. | 374/178 |
| 2002/0075163 A1 | 6/2002 | Smith et al. | ............ | 340/870.16 |
| 2004/0024561 A1 | 2/2004 | Huckaby et al. | ............ | 702/132 |
| 2004/0131104 A1 | 7/2004 | Seferian | ......................... | 374/178 |
| 2005/0232333 A1 | 10/2005 | Franch et al. | ................ | 374/178 |
| 2008/0043556 A1 | 2/2008 | Nale | ............................ | 365/212 |
| 2008/0078131 A1 | 4/2008 | Grimes | .......................... | 52/202 |
| 2008/0114555 A1 | 5/2008 | Scott | ................................. | 702/66 |
| 2009/0141767 A1 | 6/2009 | Cummins | ..................... | 374/142 |
| 2009/0314069 A1 | 12/2009 | Mitchell et al. | ............ | 73/114.13 |
| 2011/0179297 A1 | 7/2011 | Simmons et al. | ............. | 713/323 |
| 2013/0027828 A1 | 1/2013 | Noda et al. | ................... | 361/93.8 |
| 2013/0261814 A1 | 10/2013 | Shrall et al. | ................... | 700/286 |

OTHER PUBLICATIONS

European Office Action, Application No. 14821026.3, 8 pages, dated Jun. 22, 2017.
International Search Report and Written Opinion, Application No. PCT/US2014/069224, 12 pages, dated Mar. 13, 2015.
Chinese Office Action, Application No. 201480070303.9, 8 pages, dated Nov. 28, 2018.
Taiwan Office Action, Application No. 103145331, 20 pages, dated Oct. 29, 2018.

* cited by examiner

DIGITAL TEMPERATURE SENSOR WITH INTEGRATED TIMER AND BURST MODE

CROSS-REFERENCE TO RELATED APPLICATIONS

This application is a divisional of U.S. patent application Ser. No. 14/560,342 filed on Dec. 4, 2014 which claims priority from U.S. Provisional Patent Application Ser. No. 61/921,183 filed Dec. 27, 2013, which are hereby incorporated by reference in their entirety as if fully set forth herein.

TECHNICAL FIELD

The present disclosure relates to digital temperature sensor devices, in particular to a digital temperature sensor with advanced features.

BACKGROUND

A variety of integrated semiconductor temperature sensor exists. Such sensors are available in housings having a low number of pins and may provide a either an analog or a digital interface. Analog temperature sensors typically output a voltage that is proportional to the measured temperature while digital temperature sensors provide for a digital interface that is designed to encode the temperature value into a digital value and provide these to a processor, for example using a serial interface. To keep the number of pins low, these digital temperature sensors often use a single wire interface. However, other devices may use interfaces with more than one wire. While such digital temperature sensors are convenient and can be used in many applications, certain applications may in addition require features. Hence, there exists a need for improved digital temperature sensors.

SUMMARY

According to an embodiment, an integrated temperature sensor device may comprise a temperature sensor providing an analog signal corresponding to an ambient temperature, an analog-to-digital converter coupled to the sensor conditioning circuit and receiving the analog temperature signal, and a timer and control circuit which is operable to be configured to control the temperature sensor device to perform a sequence of temperature measurements and shut-down time periods, wherein multiple temperature measurements are taken during the measurement period, wherein the timer and control circuit is further operable to be programmed to set the number of temperature measurements and the length of the shut-down period.

According to a further embodiment, the programmable number of measurements ranges between 1 and 128. According to a further embodiment, the integrated temperature sensor device may further comprise a power control unit configured to switch the integrated temperature sensor device into a sleep mode during the shut-down period. According to a further embodiment, the programmable length of the shut-down period ranges from 0.5 to 128 seconds. According to a further embodiment, the control unit comprises an averaging circuit for averaging a plurality of temperature values received during each sequence of temperature measurements. According to a further embodiment, the control unit comprises a comparator for comparing each temperature value or an averaged temperature value with a threshold value. According to a further embodiment, the device comprises an external connection coupled with the comparator for output of an alert signal. According to a further embodiment, the sensor element can be a semiconductor diode. According to a further embodiment, the integrated temperature sensor device may further comprise a temperature register coupled with the analog-to-digital converter for storing the output of the analog-to-digital converter. According to a further embodiment, the integrated temperature sensor device may further comprise an average register coupled with the control unit for storing the average temperature value. According to a further embodiment, the integrated temperature sensor device may further comprise a digital filter coupled with the analog-to-digital converter. According to a further embodiment, the integrated temperature sensor device may further comprise a filter register coupled with the digital filter for storing the filtered temperature value. According to a further embodiment, the integrated temperature sensor device may further comprise a control register coupled with the digital filter for storing filter coefficients of said programmable digital filter. According to a further embodiment, the control register is set to 0 to disable the digital filter and/or wherein the control register selects one of a plurality of predefined filter coefficients. According to a further embodiment, the integrated temperature sensor device may further comprise a serial interface which may be selected form the group consisting of SPI, $I^2C$, or a single wire serial interface.

According to another embodiment, a method for operating an integrated temperature sensor device comprising the steps of: providing a temperature sensor device with a temperature sensor, analog-to-digital converter and a timer unit; performing a predetermined number of sequential analog-to-digital conversions of an analog value provided by the sensor element using the analog-to-digital converter to generate a plurality of digital values, averaging the digital values provided by the sequential analog-to-digital conversions, switching the temperature sensor device into a sleep mode for a predetermined shutdown period, and repeating the conversion, averaging and switching into sleep mode.

According to a further embodiment, the method may further comprise storing the averaged digital value in an average register. According to a further embodiment, the method may further comprise filtering the digital values using a digital filter before averaging the digital values. According to a further embodiment, the method may further comprise comparing the averaged digital value with a threshold value and outputting an alert signal if the averaged digital value is above the threshold value. According to a further embodiment, the alert signal is output on an interrupt signal line of the integrated temperature sensor device. According to a further embodiment, the alert signal is output through a serial interface of the integrated temperature sensor device. According to a further embodiment, the method may further comprise comparing each conversion with a threshold value and outputting an alert signal if the averaged digital value is above the threshold value. According to a further embodiment, the alert signal is output on an interrupt signal line of the integrated temperature sensor device. According to a further embodiment, the alert signal is output through a serial interface of the integrated temperature sensor device. According to a further embodiment, the method may further comprise storing a control value in a control register coupled with the digital filter for selecting a filter coefficients. According to a further embodiment, the average register can be read by a microprocessor or microcontroller via a serial interface of the integrated temperature sensor device.

DETAILED DESCRIPTION

Figure 1:
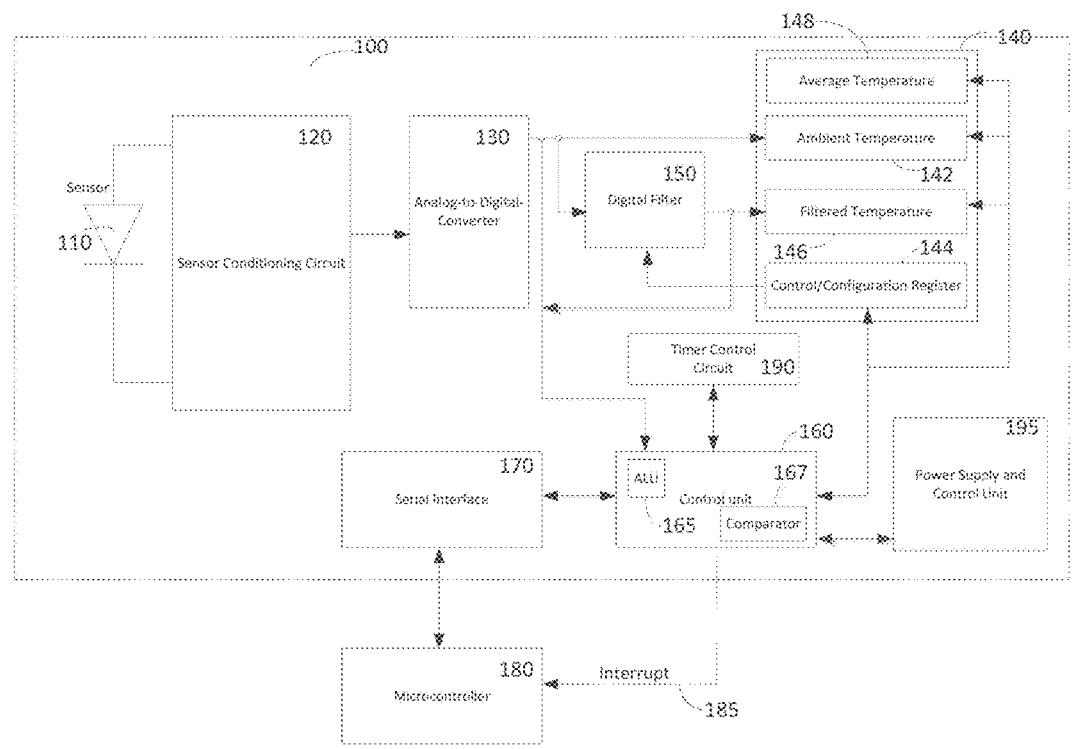
FIG. 1 shows a block diagram according to various embodiments.

According to various embodiments, a temperature sensing device with a user selectable timer interval allows to take a burst of temperature readings and monitor temperature at the preset intervals.

Traditionally extremely low power microcontrollers manage time and various time related tasks. This adds cost because the microcontroller needs to be in an active mode to control these processes. The stand-alone temperature sensor device according to various embodiment with a very fast temperature conversion rate and low operating current makes it ideal for this type of applications where typical functions such as time management can be off loaded from the controller to save more power.

Typically, timer intervals are managed by a microcontroller coupled with a separate temperature sensor device, and at preset intervals the controller samples the temperature from the sensor. In low power applications where the controller is in low power or sleep mode to save battery life, the controller will have wake up from sleep mode and measure temperature at preset intervals. This activity consumes power. With the timer mode according to various embodiments, the sensor can be programmed with preset intervals to measure a burst of temperature samples and monitor the user set temperature alert thresholds so the microcontroller does not have to consume power to do so. These integrated timer mode and burst mode features make a temperature sensor device according to various embodiments ideal for low power thermal management applications.

According to various embodiments, such a digital temperature sensor may further comprise a digital filter feature which enables a user to control the temperature sensor sensitivity. According to various embodiments, a variety of such filters may be implemented. The lowest filter setting enables the user to detect fast thermal transients, and the highest filter setting reduces the sensor sensitivity, outputting gradual changes in temperature. The temperature sensor may be configurable, for example comprising a configuration register which can be configured through a serial interface of the device.

According to various embodiments, such a low power and digital temperature sensor may output temperature data at faster speeds than conventional devices, for example at 5 millisecond intervals (typically), or 200 times per second, for a high resolution temperature data. This rate is approximately 25 times faster than the speed of a conventional temperature sensor. Due to this high speed conversion rate, the device spends less time in the temperature conversion mode which saves the overall operating power when it is used in conjunction with the low power or shutdown mode. However, due to the fast temperature conversion, fast thermal transients may be detected from the application and the device may output false temperature alerts. The solution is to implement an integrated digital filter with the options for the user to adjust the filter coefficient or the filter strength.

In conventional applications, if the application needs a digital filter, a microcontroller is used to process and filter the temperature data. According to various embodiments, the microcontroller consumes significantly higher operating current or power than the temperature sensor. Therefore, this integrated feature eliminates the associated processing requirements of a microcontroller and makes the digital temperature sensor according to various embodiments ideal for extremely low power applications.

According to some embodiments, there can be several functional blocks to a temperature sensor 100 according to various embodiments as shown in FIG. 1: the sensor proper 110 and the associated conditioning circuit 120, an analog to digital converter 130, and user programmable registers 140. A diode 110 can be used in this example to measure temperature and the sensor conditioning circuit 120 is used to bias the sensor diode 110 and scale the diode voltage to measurable levels. However, according to other embodiments, other type of sensors and if necessary conditioning circuits may be used. Basically the temperature sensor provides for an analog signal, such as a voltage or a current that can easily be converted into a temperature value. The analog value may be proportional to the temperature or may have a known linear or non-linear relationship. For example, tables stored in memory may be used within the sensor device to retrieve a temperature value corresponding to the analog value.

The analog to digital converter 130 is used to convert the ambient temperature data in digital format. The digital temperature data is available to the user in the user Ambient Temperature data register 142 and according to one operating mode may be directly written into register 142. Alternatively the output values from the analog-to-digital converter 130 may be forwarded to the control unit which may include a simple arithmetic logic unit 165. This unit may be configured to calculate an average value for a plurality of temperature values received during a temperature burst measurement cycle. A calculated average temperature may then be stored in an associated register 148. Alternatively or in addition, the output values of a digital filter block 150, whose function will be explained below in more detail, may be forwarded to the control unit and an average of the filtered temperature values may be calculated by the ALU 165 and stored in either register 148, 146 or another register. The temperature sensor may further be designed to be configurable through the registers 140.

According to various embodiments, the digital filter block 150 can be provided, wherein the ambient temperature digital data is passed through the filter engine of the digital filter 150. The filter coefficients or filter strength can be adjusted by the user using the Filter Coefficients data register 144. The filtered data is then available in the Filtered Temperature Register 146.

Figure 2:
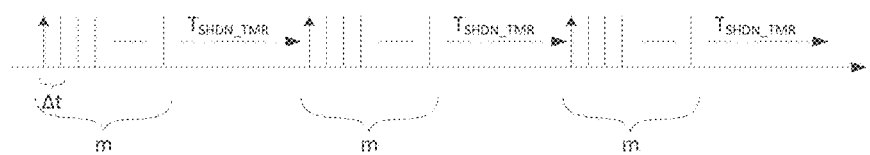
FIG. 2 shows a timing diagram of temperature sensor signals.
Figure 3:
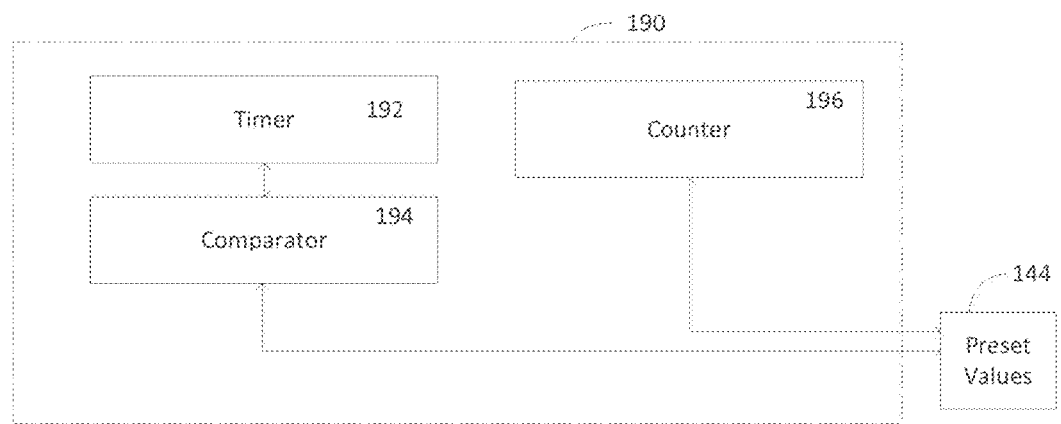
FIG. 3 shows a bock diagram of the time control circuit according to an embodiment.

According to various embodiments, the control logic of the temperature sensor may furthermore comprises a timer control circuit 190 coupled with control unit 160 as shown in FIG. 1. FIG. 2 shows such a control unit 190 in more detail. It may include a timer 192 and associated comparator 194 for comparing a timer value to a predefined number, for example a number stored in one of the configuration/control registers 144. FIGS. 1 and 3 only show a single configuration register 144. However, the device may have a plurality of respective configuration registers 144 that can be accessed through the serial interface 170 if necessary. Furthermore, a counter 196 may be implemented that may be configured to load a preset value from registers 144 and count down to 0.

In addition, a power supply and control unit 195 may be provided which may be coupled with control unit 160. The power supply control unit 195 may include circuitry for providing all necessary internal supply voltages, reference voltages etc., and may further provide respective distribution of these voltages to respective circuits or units of the device. The control unit 160 may be configured to control unit 195 to switch the entire device into a shut-down mode, such as for example a sleep mode, during which only the respective timer for determining a period TSHDN_TMR and associated logic is operable as will be explained in more detail below. The power supply and control unit is thus configured to shut down supply voltages for all units that do not need to operate during a sleep mode and to provide respective voltages to these units once the sleep-mode has been terminated. Thus, during the sleep mode the device only requires a minimum of power.

A timing diagram in FIG. 2 indicates a temperature sampling burst operating mode using such a timer control circuit 190 as shown in FIG. 3 in more detail. In FIG. 2, parameter 'm' represents the number of burst temperature samples per burst period, wherein for example such a value may be user programmable through register 144 as shown in FIG. 3, for example, can be set from 1 to 128 samples. The counter 196 in the timer and control circuit 190 is configured for counting down the number 'm' of temperature values per period. The time period Δt between sequential samplings may be determined by the speed of the analog-to-digital converter 130. If this speed is adjustable, for example by one of the control registers 144, an entire length of the measurement period may depend on the speed of the ADC 130 and the number of samples taken per measurement period. A second value $T_{SHDN\_TMR}$ refers to a low power or shutdown mode time (with timer on). Again this value can be user programmable, for example set from 0.5 s to 128 s in a respective control register 144. The timer 192 of the timer and control unit 190 may be used to measure this parameter and compare it with comparator 194 to generate respective internal signals and if necessary external one or more signals through the serial interface 170.

Each vertical line in FIG. 2 indicates a temperature sample and the letter 'm' indicates the number of samples which is set by the user using an associated user programmable data register 144. As mentioned above, the $T_{SHDN\_TMR}$ value is the user programmed timer interval value which according to some embodiments can range from, e.g., 0.5 second to 128 seconds. However, other ranges may be implemented. The timer can operate in a simple decrement mode and count down to 0 to determine the respective shut-down/sleep mode time period. As indicated in the timing diagram of FIG. 2, at the timer intervals the device takes m number of temperature bursts and may also monitor the temperature alert limits. For example, each measured value can be compared, for example, by a comparator 167 within control unit 160, with a threshold value to generate an alert through interface 170. The threshold value may be stored in yet another register 144. Alternatively or in addition, the m temperature values can be automatically averaged as explained above by control unit 160 to produce an average temperature value which can then be stored, e.g., in register 148. Then, the averaged value can be compared by control unit 160 with a threshold value. The alert can be an interrupt signal fed from the temperature device to the microcontroller through a dedicated interrupt line 185 or alternatively a signal sent through serial interface 170. Thus, according to an embodiment, a microcontroller may not process any of the measured values until an interrupt signal or respective message has been received. Thus, according to one embodiment or operating mode, only if the measured temperature exceeds the threshold value, the microcontroller may receive a signal and read the measured value to determine what actions have to follow. Multiple threshold may be implemented such as minimum and maximum values and respective comparators may be implemented in control unit 160 to generate one or more wake-up signals.

However, according to other operating modes, the temperature sensor device 100 may automatically output each temperature value during a burst or an averaged temperate value at the end of a burst, or an averaged filtered temperature value, etc. via the interface. The device may allow under program control to operate in any of the disclosed operating modes.

If all processing is performed within the temperature sensor device 100 as discussed above, such an operating mode allows for extremely low power thermal management. The sensor 100 according to various embodiments filters temperature data to prevent false alerts and is about 25× faster than a conventional device, wherein its short operating time saves power.

The fast conversion time increases sensitivity to the measuring system thermal noise. The added digital filter 150 with user programmable filter strength allows the device to manage thermal data within the temperature sensor so the microcontroller doesn't have to wake-up to perform this task.

Table 1 shows an example of a digital filter to be used in a temperature sensor 100 as shown in FIG. 1 according to various embodiments.

TABLE 1

| BIT 6-4 | N-FILTER COEFFICIENT: |
|---|---|
| | 000 = 0 (No Filter – $T_{A\_FLT} = T_A$) |
| | 001 = 1 Minimum Filter |
| | 010 = 2 |
| | 011 = 3 |
| | 100 = 4 |
| | 101 = 5 |
| | 110 = 6 |
| | 111 = 7 Maximum Filter |

Thus, the values stored in an associated one of the control register 144, for example, in bits 6-4 of one of the control registers 144 as shown in table 1, are used as an index to select one of a plurality of predefined filter coefficients. Other bits could be used according to various embodiments and the above mentioned specific bits are merely an example. Hence, a user merely needs to store a selection number to activate a specific filter function. If the index is equal to 0, then the entire filter will be disabled. However, other embodiments may use a different configuration process. For example, the filter may have a plurality of variable parameters and a user may directly program these parameters into various registers. While this option provides a user more control over the filter, it also would involve a more complicated set-up procedure. More than one type of filter or other additional functions can be implemented and a user may have the opportunity to select one of the plurality of filters or post processing routines. For example, a digital temperature sensor device according to various embodiments may have additional averaging routines and associated registers that store selectable or pre-defined averaging numbers. Various averaging routines could be implemented that calculate a mean or geometric average and optional other statistical values.

In this embodiment, the filter is an infinite impulse response low pass filter. According to an embodiment, eight different filter coefficient settings may be provided. Three bits of a control register 144 may provide for these options as explained above. However, more or less options may be provided according to other embodiments. In addition, the control register may have more bits that can be used for other configurations such as operating mode as discussed above. As can be seen in FIG. 2, if the filter coefficient is set to zero, no filter function will be applied. Thus this setting can be used as a disable function. The remaining seven settings span from a minimum to a maximum filter function.

The digital temperature sensor 100 may further use control logic 160 for controlling the filter function and may also include, for example a digital serial interface 170 for communication with an external microprocessor or microcontroller 180. The serial interface 170 may allow for access to all registers 140 to set the functionality, for example digital filter function and read the temperature data from at least one or more temperature registers 140, 146, 148. The serial interface can be any type of serial interface such as an serial peripheral interface (SPI), an I²C interface, or in particular any type of single wire interfaces, such as UNI/O, 1-WIRE, etc. Serial interface may also be used which are capable to supply power over the single communication line to further reduce the number of external pins. Other functions may be configured as discussed above.

As shown in FIG. 1, the measured temperature may be stored in a separate register 142 and the filtered temperature value may be stored in another register 146. In addition, if a burst mode is used, the m temperature values obtained during a burst mode, may be averaged in one operating mode and stored in register 148. In another operating mode, these m temperature values may be filtered using the digital filter 150 and averaged by the control unit 160 and then stored either in register 146 or 148 or an additional register. As mentioned above, further control registers 144 may be implemented for controlling the analog-to-digital converter 130, for example as mentioned above to configure speed and resolution.

Typically, the temperature conversion rate of conventional digital sensors is about 4 to 8 times per second for a high resolution data device. During this slow conversion time the device consumes continuous current and if a digital filter is implemented by a microcontroller, then the controller can measure and filter the temperature data within fractions of the sensor conversion time, or power. Therefore, there isn't much advantage in implementing an integrated digital filter with slow conversion time sensors. But using a fast conversion time of a temperature sensor according to various embodiments saves power, and the filter feature saves power by off-loading the data processing need from the controller.

Figure 4:
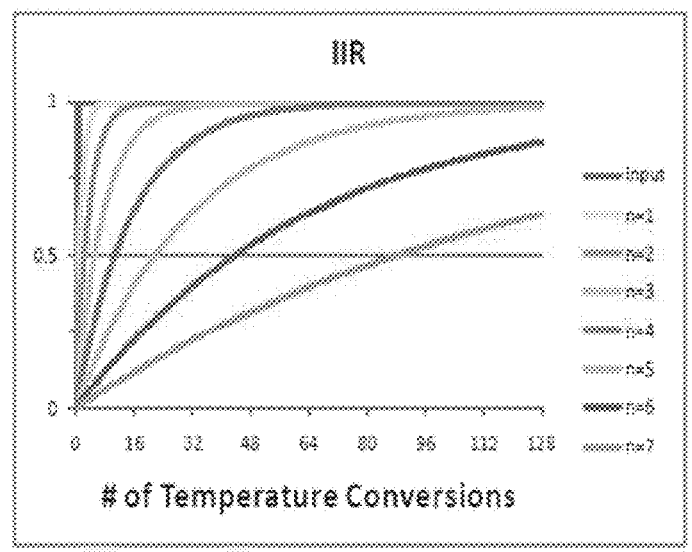
FIG. 4 shows a graph depicting transfer functions for various filter coefficients.

FIG. 4 shows the infinite impulse response (IIR) low pass filter depending on the various settings. A filtered temperature will be processed as follows:

$$T_{A\_FLT} = a \cdot T_A = (1-a) \cdot T_{A\_PRV} \quad \text{Eq. 1}$$

This equation 1 can be simplified as:

$$T_{A\_FLT} = a \cdot T_A - T_{A\_PRV} \cdot a + T_{A\_PRV} \quad \text{Eq. 2}$$

wherein $a = \frac{1}{2^n}$ and n is a user selectable filter coefficient.

What is claimed is:

1. A method for operating an integrated temperature sensor device comprising the steps of:
 coupling a sensor conditioning circuit with a temperature sensor and providing by the sensor conditioning circuit a single analog signal to an analog-to-digital converter;
 biasing the temperature sensor by the sensor conditioning circuit such that an ambient temperature can be derived from the single analog signal;
 programming a number of sequential temperature measurements to be performed during a measurement period,
 programming a length of a shut-down period following each measurement period;
 during the measurement period, performing the number of sequential temperature measurements by analog-to-digital conversions of an analog value provided by the temperature sensor using the analog-to-digital converter to generate a plurality of digital values,
 averaging the digital values provided by the sequential analog-to-digital conversions,
 during each shut-down period switching the temperature sensor device into a sleep mode for the programmed length of the shut-down period, and
 repeating the conversion, averaging and switching into sleep mode.

2. The method according to claim 1, further comprising storing the averaged digital value in a average register.

3. The method according to claim 2, wherein the average register can be read by a microprocessor or microcontroller via a serial interface of the integrated temperature sensor device.

4. The method according to claim 1, further comprising filtering the digital values using a digital filter before averaging the digital values.

5. The method according to claim 1, further comprising comparing the averaged digital value with a threshold value and outputting an alert signal if the averaged digital value is above the threshold value.

6. The method according to claim 5, wherein the alert signal is output on an interrupt signal line of the integrated temperature sensor device.

7. The method according to claim 5, wherein the alert signal is output through a serial interface of the integrated temperature sensor device.

8. The method according to claim 1, further comprising comparing each conversion with a threshold value and outputting an alert signal if the averaged digital value is above the threshold value.

9. The method according to claim 8, wherein the alert signal is output on an interrupt signal line of the integrated temperature sensor device.

10. The method according to claim 8, wherein the alert signal is output through a serial interface of the integrated temperature sensor device.

11. The method according to claim 1, further comprising storing a control value in a control register coupled with the digital filter for selecting a filter coefficients.

12. A method for operating an integrated temperature sensor device comprising a temperature sensor coupled with a sensor conditioning circuit, an analog-to-digital converter, and a timer and control circuit, the method comprising:
 providing a single analog signal to the analog-to-digital converter, wherein the temperature sensor is biased by the sensor conditioning circuit such that an ambient temperature can be derived from the single analog signal; and configuring the timer and control circuit to perform a sequence of intervals, each interval comprising a temperature measurement period followed by a shut-down period, wherein multiple temperature measurements are taken during each measurement period and the integrated temperature sensor device is switched into a low power mode during shut-down period, wherein the timer and control circuit is programmable to set a number of temperature measurements to be performed during each temperature measurement period and a length of each shut-down period.

13. The method according to claim 12, further comprising configuring a power control unit to switch the integrated temperature sensor device into a sleep mode during the shut-down period.

14. The method according to claim 12, further comprising averaging a plurality of temperature values received during each sequence of temperature measurements by an averaging circuit.

15. The method according to claim 14, further comprising comparing each temperature value or an averaged temperature value with a threshold value by a comparator.

16. The method according to claim 14, further comprising storing the average temperature value in an average register coupled with the control circuit.

17. The method according to claim 12, wherein the sensor element is a semiconductor diode and the method further comprising: biasing the semiconductor diode by the conditioning circuit such that the analog signal is proportional to the temperature or has a known linear or non-linear relationship.

18. The method according to claim 12, further comprising storing the output of the analog-to-digital converter in a temperature register coupled with the analog-to-digital converter.

19. The method according to claim 12, further comprising storing a filtered temperature value provided by a digital filter coupled with the analog-to-digital converter in a filter register coupled with the digital filter.

20. The method according to claim 19, further comprising storing filter coefficients of said digital filter in a control register coupled with the digital filter.

21. The method according to claim 20, wherein the control register is set to 0 to disable the digital filter and/or wherein the control register selects one of a plurality of predefined filter coefficients.

22. A method for operating an integrated temperature sensor device, comprising:
coupling a diode with a sensor conditioning circuit providing a voltage signal, wherein the diode is biased by the sensor conditioning circuit such that an ambient temperature can be derived from the voltage signal;
coupling an analog-to-digital converter to the sensor conditioning circuit and receiving the voltage signal;
configuring a timer and control circuit to perform a sequence of cycles, each cycle comprising a temperature measurement period followed by a shut-down period, wherein multiple temperature measurements are taken during each measurement period and the integrated temperature sensor device is switched into a low power mode during each shut-down period, and
programming the timer and control circuit to set a number of temperature measurements to be performed during each temperature measurement period and a length of each shut-down period.

23. The method according to claim 22, further comprising averaging a plurality of temperature values received during each sequence of temperature measurements.

24. The method according to claim 22, wherein the voltage signal is proportional to the temperature or has a known linear or non-linear relationship.

25. The method according to claim 24, further comprising storing a table in a memory for retrieving a temperature value depending on a measured voltage.

* * * * *